United States Patent [19]

Naganuma

[11] 4,346,319
[45] Aug. 24, 1982

[54] ROTARY ELECTROMAGNETIC ACTUATOR
[75] Inventor: Nobuyuki Naganuma, Nagoya, Japan
[73] Assignee: Brother Kogyo Kabushiki Kaisha, Nagoya, Japan
[21] Appl. No.: 250,837
[22] Filed: Apr. 3, 1981
[30] Foreign Application Priority Data Apr. 15, 1980 [JP] Japan .................................. 55-50182

[51] Int. Cl.³ ........................................... H02K 33/00
[52] U.S. Cl. ....................................... 310/36; 335/272
[58] Field of Search ..................................... 310/36–39; 335/272, 229, 230

[56] References Cited
U.S. PATENT DOCUMENTS 2,930,945  3/1960  Weathers et al. ............... 310/36 X
3,816,779  6/1974  Lundin ............................ 310/37
4,164,722  8/1979  Garvey ............................ 335/272

Primary Examiner—Donovan F. Duggan
Attorney, Agent, or Firm—Browdy and Neimark

[57] ABSTRACT

A rotary electromagnetic actuator of swing type capable of generating sufficient torque in a wide swing range. The actuator comprises a stator having plural stator poles and a rotor having rotor poles as many as the stator poles. Each of the stator poles is provided with plural concave curved surfaces which have respectively different radii from the rotary center of the rotor and are arranged in order of size of radius to form stairs ascending in the forward rotation direction of the rotor. On the contrary each of the rotor poles is in form of stairs descending in the same direction. The pitch of the stairs of the stator is longer than that of the rotor so that each couple of edges of both stairs may sequentially approach owing to the magnetism therebetween to each other for rotating the rotor step by step.

5 Claims, 8 Drawing Figures

ROTARY ELECTROMAGNETIC ACTUATOR

SUMMARY OF THE INVENTION

This invention relates to an improvement of a rotary electromagnetic actuator of swing type.

A rotary actuator of this type is provided with a stator having at least two stator poles, a rotor having at least two rotor poles rotatably arranged so as to enable each of the stator poles to face to the corresponding rotor pole respectively, an electromagnetic coil wound on the stator for energizing the stator pole to rotate the rotor in forward direction, means cooperating wih the rotor for rotating the rotor in backward direction when the electromagnetic coil is not energized, and positioning means for determining a rotating range of the rotor.

Conventional rotary actuators are large in the variation in torque within the range of swing or rotating angle, so it is required to inevitably narrow the rotating range or enlarge the size of the actuator itself when a torque more than a certain value is needed. As a rotary actuator used in a typewriter for feeding the ribbon, which primarily must be capable of generating a torque more than a certain level ranging the whole rotating movement thereof and must also be accommodated by all means in a limited narrow space, the conventional type is unsuitable.

It is therefore a primary object of this invention, against the above-mentioned background, to provide an improved rotary electromagnetic actuator capable of generating larger torque than a desired level in a larger rotating range than the conventional type without enlarging the size thereof.

According to the present invention each pole surface of stator poles is made in a form of plural steps in an ascending arrangement in forward rotation direction for providing plural stator pole edges, and each pole surface of rotor poles is made in a form of plural steps as many as the steps of the stator pole in a descending arrangement in the forward rotation direction for providing rotor pole edges as many as the stator pole edges, and the pitch of the rotor pole edges is different from the pitch of the stator pole edges. In other words, each of the stator poles is provided with plural concave curved surfaces having respectively different radii from the rotating center of the rotor and the plural stator surfaces are arranged in order of size of radius, beginning with the largest along the forward rotation direction, and each of rotor poles is provided with plural convex curved surfaces having respectively different radii from the rotating center of the rotor and the plural rotor surfaces are arranged in order of size of radius, beginning with the largest along the forward rotation direction.

DETAILED DESCRIPTION OF A PREFERRED EMBODIMENT

Figure 1:
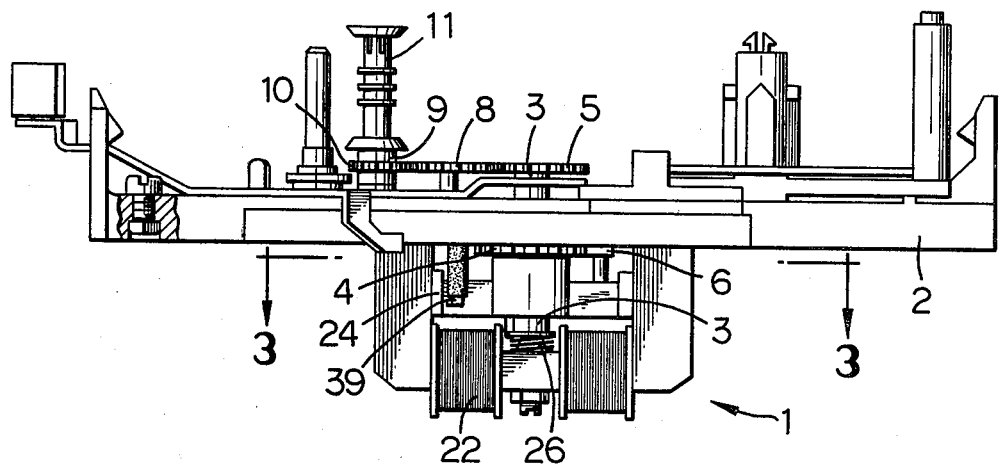
FIG. 1 is an elevational view of an embodiment of a rotary electromagnetic actuator used in a drive mechanism of a typewriter for feeding a ribbon.
Figure 3:
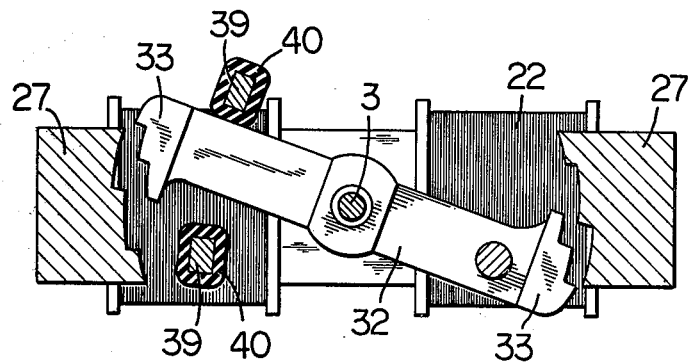
FIG. 3 is a partially enlarged sectional view taken along the section line 3—3 in FIG. 1.
Figure 2:
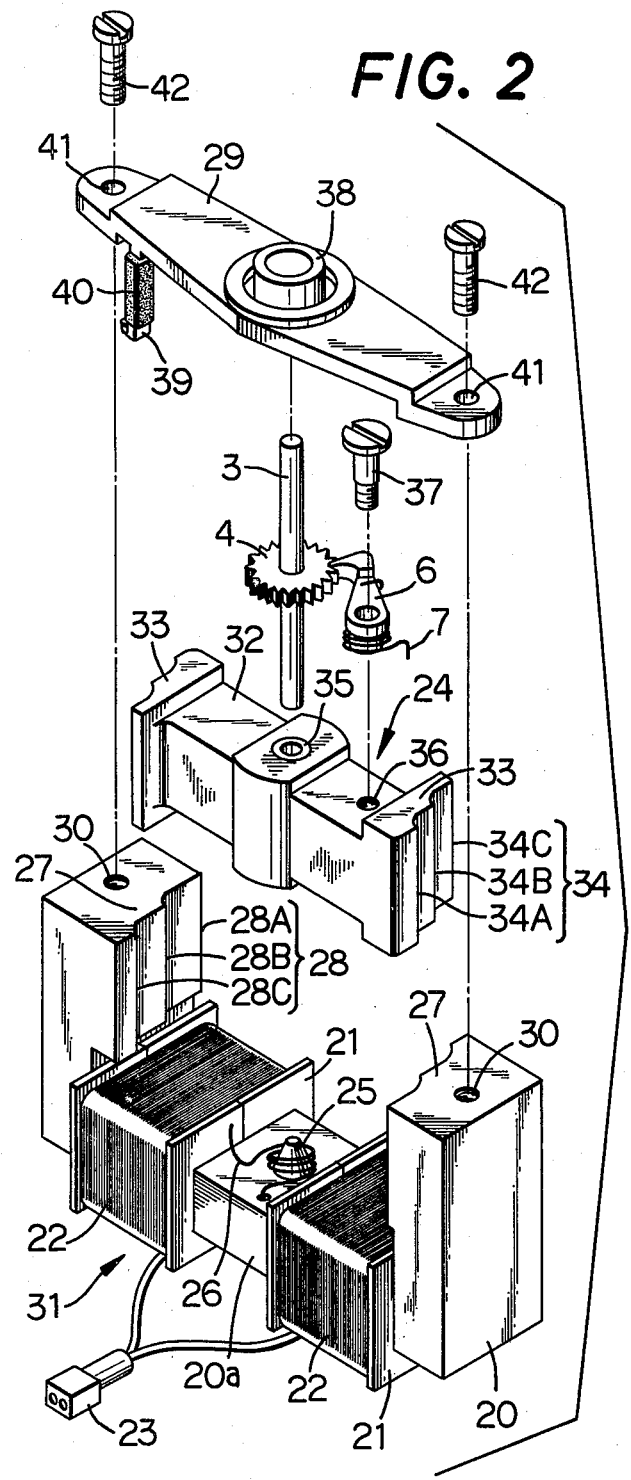
FIG. 2 is an exploded perspective view of the rotary actuator shown in FIG. 1.

With reference to FIGS. 1–3 structure of an embodiment of this invention, and with FIGS. 4 and 5 operational features thereof, will be described respectively hereunder.

As shown in FIG. 1 a rotary electromagnetic actuator 1, which is widely used in a typewriter as a drive source for ribbon feeding, is secured to a base plate 2 of a partially illustrated drive mechanism for ribbon feeding by way of a later described bracket 29 (see FIG. 2) for the rotary actuator 1. A rotary shaft 3 is rotatably carried by a rotor 24, in a bore formed in the center of the rotor 24, and extends through the bracket 29 and the base plate 2 as far as projecting up outside. The rotary shaft 3 is provided with a latchet wheel 4 secured on the middle portion thereof and located between the rotor 24 and the bracket 29, and a gear 5 is secured on the tip of the rotary shaft 3 projecting up outside the base plate 2. On the upper surface of the rotor 24 a feed pawl 6 is pivoted, as shown in FIGS. 1 and 2, being constantly biased by a spring 7 so as to be engaged with the latchet wheel 4. When therefore the rotary actuator is energized to rotate counterclockwise, in FIG. 2, the rotor 24, the rotation is transmitted via the feed pawl 6 to the latchet wheel 4 and further to the gear 5 by way of the rotary shaft 3. The rotation of the gear 5 is transmitted through a counter gear 8 retained by the base plate 2 and a drive gear 10 to a drive shaft 9, on which a driving member 11 for ribbon feeding is secured. The driving member 11 is constantly urged on the peripheral surface of a winding spool (not shown) for rotating the same due to the rotation of the driving member 11 so that the ribbon may be wound up on the winding spool. For the ribbon feeding operation it is necessary to ensure ribbon feeding of a predetermined constant amount, and the driving torque of the driving member 11 must be therefore maintained for a predetermined time duration at more than a predetermined level of value. When the energization of the rotary actuator 1 is released, the rotor 24 is clockwise rotated due to the action of a later described spring 26 for being restored to the original position. The rotation of the rotor 24 will not then be transmitted to the rotary shaft 3, because the feed pawl 6 is idly slided on the periphery of the latchet wheel 4, so the drive shaft 9 is rotated in one direction only. Against the above described ribbon feeding mechanism utilizing a rotary actuator 1, explanation will be progressed to the detail of the rotary actuator itself with reference to FIGS. 2 and 3.

A yoke 20 is of almost U-shape, and on a connecting portion 20a thereof located in the middle a pair of bobbins 21 are disposed with a certain space therebetween for being wound with an electromagnetic coil 22 on either of them. One ends of coils 22 wound on the bobbins 21 are connected together so that the fluxes may be added when the two coils 22 are energized, and each of the other ends is connected respectively to a terminal 23 of the power source. On the central portion of the connecting portion 20a of the yoke 20 a projection 25 for rotatably supporting the rotor 24 is projectingly disposed, about which a spring 26 for biasing the rotor 24 clockwise in FIG. 2 is retained. One end of the spring 26 is engaged with the connecting portion 20a of the yoke 20 and the other end with the lower portion of the rotor 24 respectively. On either of a pair of leg portions of the yoke 20 a stator pole 27 is disposed. The pole surface of the stator pole 27 is in a form of steps having three concave curved surfaces with different radii from the rotating center of the rotor 24. The three concave curved surfaces are arranged in order of size of radius, beginning with the largest along the forward rotation direction of the rotor 24. In other words, the three steps are formed in an ascending style in the forward rotation direction of the rotor 24, with a result of forming a first stator pole edge 28A, a second stator pole edge 28B, and a third stator pole edge 28C on the stator pole 27. On the upper end of each leg portion of the yoke 20 a tapped hole 30 is formed in the middle portion for being secured with the bracket 29 by a screw bolt 42. A stator 31 is composed of in this way the yoke 20, the bobbins 21, the coils 22, and the stator poles 27.

The rotor 24, as a counterpart to the stator 31, will be described next. On either end of a rotor arm 32 a rotor pole 33 is disposed. The pole surface of the rotor pole 33 is formed into a stepped shape having three convex surfaces which are different in radius from the rotating center of the rotor 24. The convex curved surfaces are arranged in order of size of radius, beginning with the largest, in a descending arrangement along the forward rotation direction of the rotor 24. As a result of which a first rotor pole edge 34A, a second rotor pole edge 34B, and a third rotor pole edge 34C are formed on the rotor pole 33. The pitch of the rotor pole edges is shorter than that of the stator pole edges. In the center of the arm 32 a through-bore is formed, in which the rotary shaft 3 is rotatably supported via a metal bearing 35, and the lower end of the through-bore is fitted by the projection 25 for rotatably supporting the rotor 24 in relation to the yoke 20. And a tapped hole 36 is formed on the rotor arm 32 for rotatably retaining, with the aid of a stepped screw 37, the feed pawl 6 on the rotor arm 32. The feed pawl 6 is so biased by a spring 7 as to be engaged at the tip thereof with a teeth portion of the latchet wheel 4. On the lower side of the bracket 29 a pair of stop members 39 are disposed, on either of which a tubular rubber member 40 is fitted. The bracket 29 and the stator 31 are, as mentioned earlier, fastened into one body with the pair of bolts 42 passing the through-bores 41 bored in either end portion of the bracket 29 and screwed into the tapped holes 30 in the stator 31.

Operation of the rotary actuator 1 will be described hereunder.

When the coils 22 are not energized, the rotor 24 is maintained at the original position thereof ($S_1$ position in FIG. 5) as shown in FIG. 3, being in engagement with the stop member 39 due to the biasing force of the spring 26, that is being deviated from the stator pole 27. In this status the first stator edge 28A and the first rotor edge 34A are most closely positioned, the second stator edge 28B and the second rotor edge 34B are positioned second to the above two in respect of their interdistance, and the third stator edge 28C and the third rotor edge 34C are positioned most separated.

Figure 4A:
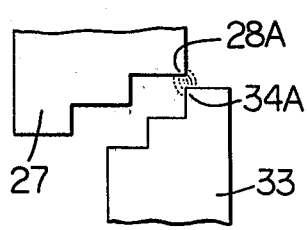
FIG. 4 (a)-(c) are respectively an explanatory view for explaining the relationship between the edges of the stator pole and the rotor pole relative to the swing or rotating movement of the rotor.
Figure 4B:
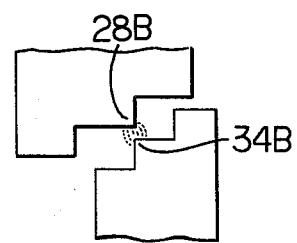
Figure 4C:
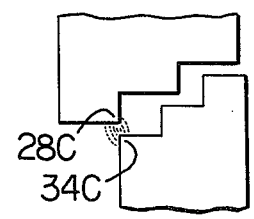

When power is put on the coils 22 to energize the stator pole 27, the rotor 24 begins to counterclockwise rotate, because of being pulled at the rotor pole 33 thereof by the stator pole 27, gradually changing the posture as illustrated in FIG. 4 (a) to (c).

As a first step the status shown in FIG. 4 (a) appears, wherein the first stator edge 28A as an effective edge approaches to the first rotor edge 34A most closely, then the mutual pulling magnetic force between the two reaches the peak because the varying ratio of the permeance between both is the greatest at this time. The pulling magnetic force then observed between the second couple 28B, 34B and the third couple (28C, 34C) are negligibly small in comparison to that between the first couple. The torque acting on the rotor 24 in the status of FIG. 4 (a) substantially owing to the magnetic force between the first couple (28A, 34A) corresponds to the value at the point A on the torque curve of FIG. 5.

Figure 5:
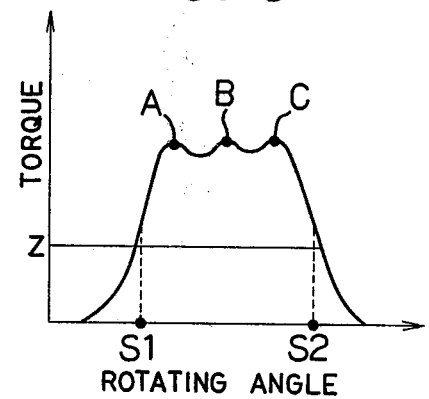
FIG. 5 is a graph showing the variation of torque in response to positions of the rotor in rotating.

In the course of transiting from the FIG. 4 (a) status to the FIG. 4 (b) status the torque acting on the rotor 24 is gradually lowered from the point A in FIG. 5, as the varying ratio of the permeance between the stator pole 27 and the rotor pole at this time is smaller than that of the above-mentioned permeance between the first couple (28A, 34A), but it is turned again to an upward curve as it gradually comes under the influence of the pulling force between the second couple (28B, 34B). At the status of FIG. 4 (b) the second stator edge 28B and the second rotor edge 34B are faced to each other in the most closely approached condition, and the torque acting on the rotor 24 shows the value at the point B almost equal to that at the point A of FIG. 5, as the varying ratio of the permeance between the two becomes large at this time.

Further rotation of the rotor 24 so as to reach the status of FIG. 4 (c) will make the torque acting on the rotor 24 gradually descends from the point B in FIG. 5, just similarly to the tendency observed in the transition from FIG. 4 (a) to FIG. 4 (b), and again gradually ascends due to the pulling force between the third couple (28C, 34C). At the status of FIG. 4 (c) the third stator edge 28C and the third rotor edge 34C are placed in the most closely faced condition, so the torque acting on the rotor 24 shows the value at the point C, almost equal to those at A and B, because the varying ratio of the permeance between the two becomes large just like in the previous cases. Then the rotor 24 receives a rapidly decreasing torque for being further rotated to a position where it is engaged with the stopper 39, the point $S_2$ in FIG. 5.

The rotor 24 is, by energization of the coils 22, placed in this way under the rotational force, which follows the torque curve from the point $S_1$, passing A, B, and C, to the point $S_2$, so as to be rotated.

Owing to this swing or rotating movement of the rotor 24 in the range from $S_1$ to $S_2$ under the torque over the predetermined value Z the afore-mentioned predetermined ribbon feed operation is carried out.

Figure 6:
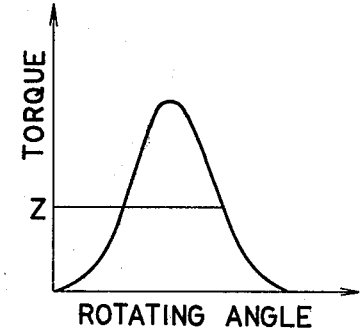
FIG. 6 is a graph showing the variation in torque in a conventional rotary electromagnetic actuator.

The curve shown in FIG. 6 indicates a torque curve in a conventional rotary electromagnetic actuator. The swing range of the rotor wherein torque over the predetermined value Z necessitated for the ribbon feeding can be generated is extremely small.

When the coils are released of power current the rotor 24 is clockwise rotated owing to the biasing force of the spring 26 so as to be restored to the original position, being engaged with the stop member 39.

As detailed in the above, the inner surface of the stator pole 27 and the outer surface of the rotor pole 33 are respectively formed into stepped (three steps in this embodiment) status, for providing mutually corresponding pole edges 28A, 28B, 28C and 34A, 34B, 34C. And each closely faceable couple according to the swing movement of the rotor becomes effective in magnetism one after another for contributing to the enlargement of the swinging or rotating range of the rotor over the predetermined torque value. And compact structure of the rotary actuator of this invention for a large torque output thereof enables it to be utilized for the ribbon feeding use in a typewriter.

What is claimed is:

1. In a rotary electromagnetic actuator comprising a stator having at least two stator poles, each of which has a pole surface; a rotor having at least two rotor poles, each of which has a pole surface, rotatably arranged so as to enable each of the pole surfaces of the stator to face to the corresponding pole surface of the rotor respectively; an electromagnetic coil wound on the stator for energizing the stator pole to rotate the rotor in one direction; means cooperating with the rotor for rotating the rotor in opposite direction when the electromagnetic coil is not energized; and first positioning means and second positioning means for determining a rotating range of the rotor; the improvement wherein said each pole surface of said stator poles is in a form of plural steps in an ascending arrangement in said one direction for providing plural stator pole edges, and said each pole surface of said rotor poles is in a form of plural steps as many as said steps of said stator pole in a descending arrangement in said one direction for providing rotor pole edges, and the pitch of the rotor pole edges is different from the pitch of the stator pole edges.

2. In a rotary electromagnetic actuator comprising a stator having at least two stator poles; a rotor having at least two rotor poles rotatably arranged so as to enable each of the stator poles to face to the corresponding rotor pole respectively; an electromagnetic coil wound on the stator for energizing the stator pole to rotate the rotor in one direction; means cooperating with the rotor for rotating the rotor in opposite direction when the electromagnetic coil is not energized; and positioning means for determining a rotating range of the rotor; the improvement wherein said each of said stator poles has plural concave curved surfaces having respectively different radii from the rotating center of the rotor and the plural stator surfaces are arranged in order of size of radius, beginning with the largest along said one direction for providing plural stator pole edges, and said each of said rotor poles has plural convex curved surfaces having respectively different radii from the rotating center of the rotor and the plural rotor surfaces are arranged in order of size of radius, beginning with the largest along said one direction for providing plural rotor edges as many as the stator pole edges, and the pitch of the rotor pole edges is different from the pitch of the stator pole edges.

3. In a rotary electromagnetic actuator comprising a base plate; a substantially U shaped yoke secured to the base plate having two stator poles at the free ends thereof; a rotor having two rotor poles rotatably mounted on the yoke and arranged between two stator poles so as to enable each of the stator poles to face to the corresponding rotor pole respectively; a first stop member and a second stop member secured to the base plate so as to be engageable with the rotor for determining a rotating range of the rotor; biasing means for biasing the rotor toward the first stop member; and an electromagnetic coil wound on the yoke for energizing the stator pole to rotate the rotor in a direction toward the second stop member against a biasing force of the biasing means; the improvement wherein said each of said stator poles has plural concave curved surfaces having respectively different radius from the rotating center of the rotor and the plural stator surfaces are arranged in order of size of radius, beginning with the largest along the direction for providing plural stator pole edges, and said each of said rotor poles has plural convex curved surfaces having respectively different radii from the rotating center of the rotor and the plural rotor surfaces are arranged in order of size of radius, beginning with the largest along the direction for providing plural rotor edges as many as said stator pole edges, and the pitch of the rotor pole edges is different from the pitch of the stator pole edges.

4. A rotary electromagnetic actuator as set forth in claim 3 wherein, said pitch of the rotor pole edges is shorter than the pitch of the stator pole edges.

5. A rotary electromagnetic actuator as set forth in claim 4 wherein, said stator pole edges consist of first, second and third stator pole edge along said one direction, and said rotor pole edges consist of first, second and third rotor pole edge along said one direction, and when said electromagnetic coil is energized, said rotor is rotated in said one direction upon an effective magnetic force, in order substantially between said first stator pole edge and first rotor pole edge, between said second stator pole edge and said second rotor pole edge, and between said third stator pole edge and said third rotor pole edge.

* * * * *